United States Patent [19]

Taren et al.

[11] 4,357,102

[45] Nov. 2, 1982

[54] PHOTOGRAPHY SYSTEM WITH LARGE LENGTH TO WIDTH PICTURE FORMAT RATIO

[76] Inventors: Jack Taren, 1084 Vistagrande, Pacific Palisades, Calif. 90272; J. Herbert Klein, 11728 Wilshire Blvd., Los Angeles, Calif. 90025

[21] Appl. No.: 259,835

[22] Filed: May 4, 1981

[51] Int. Cl.³ .............................................. G03B 27/32
[52] U.S. Cl. .................................... 355/77; 354/159; 354/222; 355/40; 355/52
[58] Field of Search ....................... 354/222, 159, 120; 355/40, 52, 77

[56] References Cited

U.S. PATENT DOCUMENTS

| | | | |
|---|---|---|---|
| 3,377,914 | 4/1968 | Jeffee | 355/52 X |
| 3,490,844 | 1/1970 | Sapp, Jr. | 354/222 X |
| 3,678,834 | 7/1972 | Melillo | 354/159 |
| 4,202,624 | 5/1980 | Krehbiel | 354/159 X |
| 4,249,812 | 2/1981 | Hall | 354/222 |

*Primary Examiner*—Richard A. Wintercorn
*Attorney, Agent, or Firm*—Ralph B. Pastoriza

[57] ABSTRACT

The viewfinder of a conventional 35-mm. camera has a horizontal portion masked off by an appropriate insert so that the scene viewed has a length to width ratio greater than 2.0 to 1 and preferably about 3 to 1. This wide field of view corresponds to wide screen pictures such as cinemascope. Pictures are taken using the masked viewfinder and during printing of the film, the film gate in an enlarger is correspondingly masked or provided with an aperture of the same ratio as that of the unmasked portion in the viewfinder. Printing paper is provided with a proportional ratio so that the entire printing paper is used in printing the picture from the film. Pictures can thus be returned to the photographer which are of a substantially larger length to width ratio than conventional pictures, all to the end that elongated bodies such as ships or trains can be readily photographed holding the camera in a horizontal position, or, alternatively, tall buildings can be accommodated by holding the camera in a rotated 90° position.

5 Claims, 6 Drawing Figures

PHOTOGRAPHY SYSTEM WITH LARGE LENGTH TO WIDTH PICTURE FORMAT RATIO

BACKGROUND OF THE INVENTION

This invention relates generally to photography and more particularly to a photography system providing photographic prints with large length to width format ratio.

The normal image format for a conventional still camera is either square or rectangular with a ratio of length to width of 1.4 to 1. More often than not, however, there are situations where it would be desirable to photograph objects which extend for a substantial distance in a horizontal direction; for example, "stretched" aircraft, parades, trains and the like. Similarly, there are situations where a relatively long vertical format is desired such as in photographing tall buildings.

The foregoing problems have been solved by providing anamorphic type lens which will contract a horizontal dimension into a size which can be accommodated on a film image, the negative then being printed with another anamorphic lens which will stretch out the horizontal dimension or vertical dimension as the case may be. Another solution is shown in U.S. Pat. No. 4,249,812 issued to Jon F. Hall on Feb. 10, 1981 wherein a specially modified 35-mm camera is provided which will enable the photograph format ratio to exhibit a large length to width value and thereby provide the desired format.

In the case of using anamorphic lenses, they must be specially provided and are relatively expensive. Further, there is some loss in quality since the light must pass through these lenses. Additionally, in reproducing the photographed image another anamorphic lens must be provided.

In the case of the prior issued patent to Mr. Hall, while very good quality pictures can be provided without anamorphic lenses, it is necessary to provide a new camera or extensive modifications in a conventional type camera.

BRIEF DESCRIPTION OF THE PRESENT INVENTION

With the foregoing considerations in mind, the present invention contemplates a photography system which will provide a large length to width picture format ratio without requiring the use of anamorphic lenses and without requiring any extensive modifications to conventional type 35-mm. still cameras, all to the end that a more economical system results.

More particularly, in accord with the present invention, the viewfinder of a conventional 35-mm. camera has a horizontal portion masked off to leave the scene viewed with a length to width ratio greater than 2.0 or, for example, 3 to 1 if desired. The scene viewed through the unmasked portion is photographed, the exposed film developed and the desired picture format enlarged in an enlarger by utilizing a similar mask in the film gate of the enlarger. The printing paper is of the desired format corresponding to the length to width ratio of the unmasked portion of the viewfinder and the unmasked portion in the film gate of the enlarger so that no printing paper is wasted and the resulting print is of the desired format.

The masking off of the camera viewfinder and the enlarger film gate can be effected by simple metal inserts and thus there is not required any appreciable modification of existing equipment.

BRIEF DESCRIPTION OF THE DRAWINGS

A better understanding of this invention will be had by now referring to the accompanying drawings in which.

DETAILED DESCRIPTION OF THE INVENTION

Figure 1:
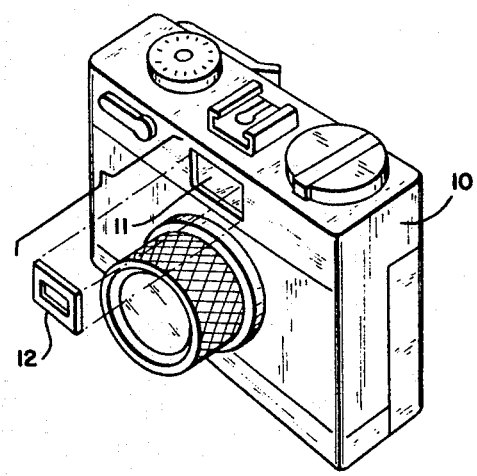
FIG. 1 is a front three quarter perspective view of a conventional inexpensive 35-mm. still camera with which the present invention is used.

Referring first to FIG. 1, there is shown a conventional inexpensive 35-mm camera 10 having a viewfinder 11 and showing in exploded perspective view an insert member 12. This insert has a central elongated horizontal window which is defined by making the top and bottom margins wider than the left and right margins. The outer dimensions of the insert are such that the insert itself will fit neatly within the viewfinder 11 and can be readily permanently secured to this portion of the viewfinder.

Figure 2:
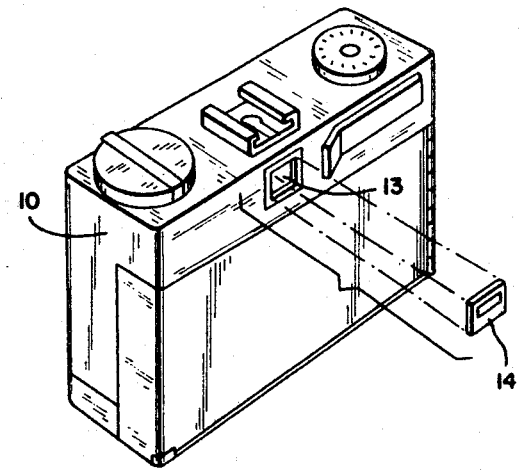
FIG. 2 is a three-quarter rear perspective view of the camera of FIG. 1 showing a further component of the present invention.

Referring to the rear perspective view of FIG. 2, there is shown an additional insert member 14 with an elongated horizontal window, this insert being dimensioned to fit within the rear portion of the viewfinder indicated at 13. The inserts 12 and 14 described in FIGS. 1 and 2 function together so that the open horizontal windows or unmasked portions are in exact registration to provide a view of a scene having a length to width ratio greater than 2.0 and preferably at least of 3 to 1.

Figure 3:
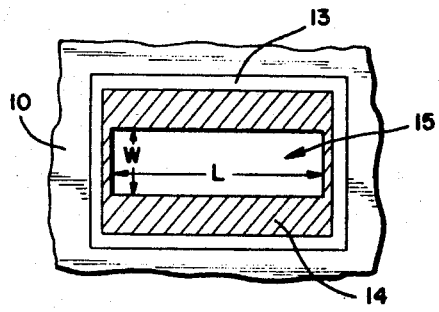
FIG. 3 is a fragmentary front elevational view of the viewfinder of the camera shown in FIG. 2 illustrating a first type of masking operation.

The foregoing will be better understood by referring to the enlarged view of FIG. 3 wherein the insert 14 is shown positioned in the rear opening of the viewfinder 13 so that top and bottom marginal areas of the viewfinder are blocked off to leave a central area 15 unmasked. This central area has a length L and a width W as indicated, the ratio of L to W being approximately 3 to 1, in the example illustrated.

An advantage in blocking off the top and bottom marginal areas to provide the desired viewing format is that when taking a picture, the central portion of the lens will be used since this portion of the lens is "synchronized" with the viewfinder to adjust for parallax.

In the case of a single lens reflex camera, there would, of course, be only provided one insert such as the insert 14 positioned into the rear of the viewfinder. Again, the unmasked central portion would correspond to the central portion of the lens.

Figure 4:
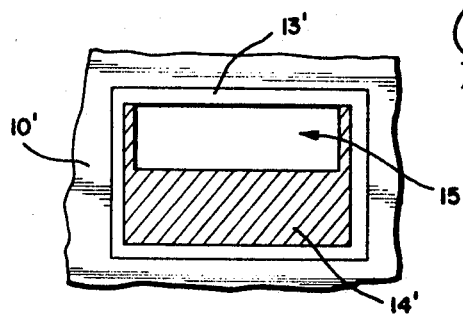
FIG. 4 is a view similar to FIG. 3 illustrating a modified type of masking.

It should be understood, however, that the desired format can be provided by blocking off the bottom marginal area of the viewfinder such as illustrated in FIG. 4. In this modification, the camera is indicated at 10', the viewfinder opening at 13' and a specially designed insert 14' is shown in position. Here the bottom marginal area of the viewfinder is blocked off to leave a top unmasked portion 15'.

Figure 5:
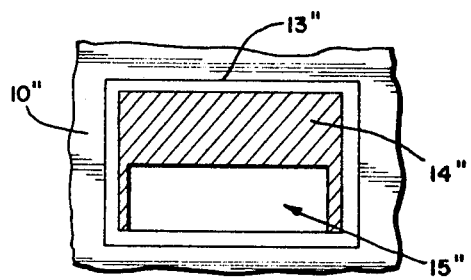
FIG. 5 is a view similar to FIG. 3 showing yet a further modified type of masking; and, FIG. 6 is a schematic perspective view of a printing enlarger with certain components shown in exploded relationship useful in explaining further features of the system of this invention.

It is also possible to mask off the top portion of the viewfinder as illustrated in FIG. 5 wherein in a still further modified arrangement there is shown a camera 10" having a viewfinder opening 13" receiving an insert 14", which blocks off the upper marginal area. There is thus left an unmasked lower bottom portion 15".

While the preferred embodiment is to block off the top and bottom margins equally as shown in FIG. 3, it is possible to mask off the viewfinder in the manner shown in either FIG. 4 or FIG. 5.

Figure 6:
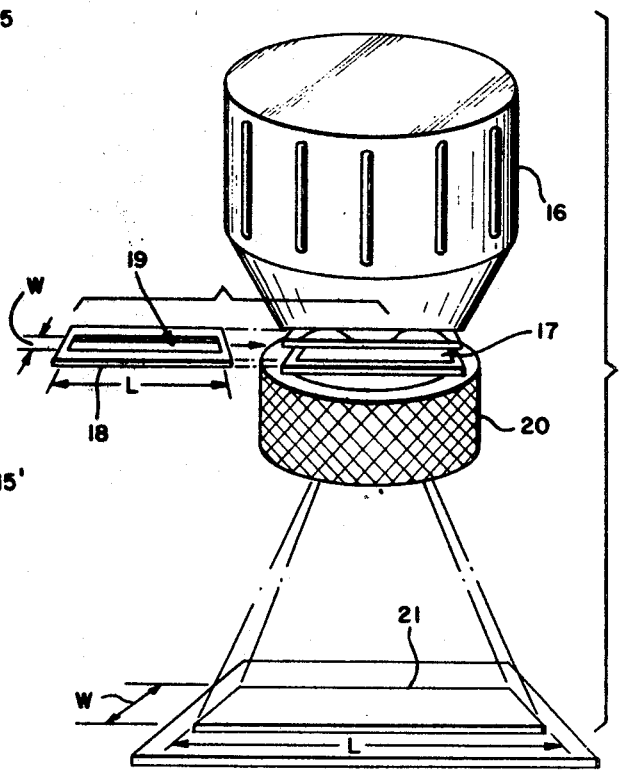

Referring now to FIG. 6, there is schematically indicated an enlarger 16 having a film gate 17 for receiving normal 35-mm. film from which enlargement prints are to be made.

In accord with the present invention, there is provided an additional insert 18 constituting a means for masking the film gate in the same manner that the viewfinder of the camera is masked.

Thus, assuming that the insert 14 is described in FIGS. 1, 2 and 3 as used wherein the central area of the viewfinder is unmasked, there will be provided a similar masking for the film gate wherein the long margins are blocked to leave a central area of the film gate free of any masking, this central area having a length to width ratio corresponding to that for the unmasked area in the viewfinder of FIG. 3. In FIG. 6 the same letters L and W are used since these dimensons are the same as in the viewfinder.

It will now be appreciated that only that portion of the negative film in registration with the unmasked portion of the insert 18 will pass through the enlarger and thus will correspond to that which was viewed through the viewfinder.

As shown in FIG. 6, a piece of printing paper 21 has a length L' and a width W' having a ratio proportional to the ratio of L to W of the insert 18 for the enlarger so that the projected enlarged picture will coincide precisely with the printing paper 21. There is thus not wasted any printing paper and the finished glossy print or other type development is of the desired format ratio.

From all of the foregoing it will be readily apparent that an improved photography system has been provided wherein substantially no modification of existing equipment is required and yet desired picture formats wherein the ratio of length to width is greater than 2.0 can readily result.

While inserts have been shown for masking the viewfinder in a conventional camera, it will be understood that the method can be carried out by simply building in a viewfinder which provides for a field of view corresponding to the desired format ratio. Further, the invention is clearly applicable to cameras other than 35 mm. cameras as well as to movie cameras and large portrait type cameras and even mini-cameras using 16 mm film.

We claim:

1. A method of providing a length to width picture format ratio greater than 2.0 with a camera having a viewfinder, including the steps of:
    (a) masking off an horizontal portion in the viewfinder so that the scene viewed has a length to width ratio greater than 2.0;
    (b) photographing a desired scene with said camera as viewed through the unmasked portion of the viewfinder;
    (c) developing the exposed film;
    (d) masking off a portion of the film gate in an enlarger in precisely the same manner as the viewfinder of the camera was masked;
    (e) providing a printing paper on said enlarger having a length to width ratio corresponding to the length to width ratio in proportion with the length to width ratio of the unmasked portion of said film gate; and
    (f) printing an enlargement of the portion of the picture on the film passing through the unmasked portion of the film gate on said printing paper to thereby provide said picture format.

2. The method of claim 1, in which said masking is accomplished by blocking off a top and bottom marginal area in the viewfinder to leave the central area of the viewfinder unmasked.

3. The method of claim 1, in which said masking is accomplished by blocking off a bottom portion of the viewfinder to leave the top portion of the viewfinder unmasked.

4. The method of claim 1, in which said masking is accomplished by blocking off the top portion of the viewfinder to leave the bottom portion of the viewfinder unmasked.

5. The method of claim 1, in which said length to width ratio is at least 3 to 1.

* * * * *